(Model.)
E. A. LEGATE.
SHEEP RACK.
No. 310,897. Patented Jan. 20, 1885.
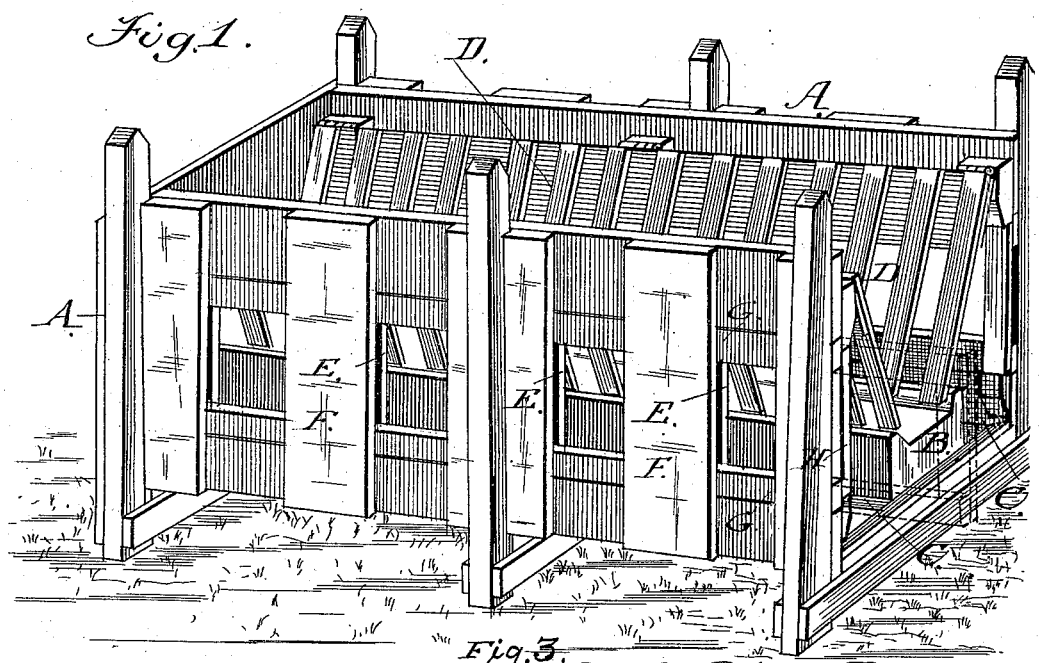
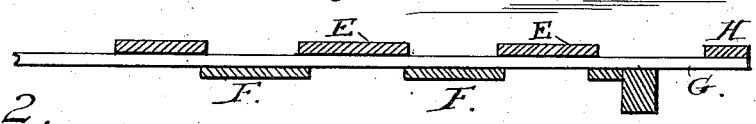
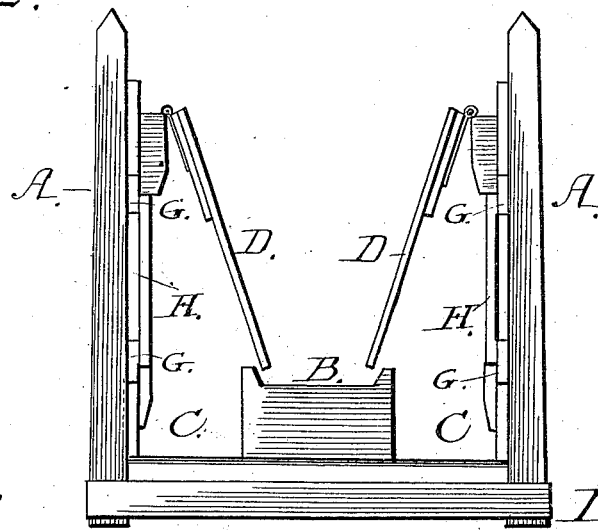
Attest:
James Willes
Inventor:
Edgar A. Legate
per Edw. W. Donn
Atty.

UNITED STATES PATENT OFFICE.

EDGAR A. LEGATE, OF CHARLEMONT, MASSACHUSETTS.

SHEEP-RACK.

SPECIFICATION forming part of Letters Patent No. 310,897, dated January 20, 1885.

Application filed April 21, 1884. (Model.)

*To all whom it may concern:*

Be it known that I, EDGAR A. LEGATE, a citizen of the United States, residing at Charlemont, in the county of Franklin and Commonwealth of Massachusetts, have invented a new and useful Improvement in Sheep-Racks, of which the following is a full and true specification.

It is well known to persons keeping sheep that much difficulty is experienced in keeping their racks clean, and especially in feeding hay and grain, either whole, cracked, or ground, it is often troublesome to keep the grain clean and free from the hay without sweeping out the hay before the grain is fed, causing much waste. In feeding grain, too, in ordinary racks, it is annoying to have the sheep crowding each other, the stronger prevailing and forcing out the weaker ones. My rack avoids these difficulties, is handy, economical in construction, and in feeding saving time and trouble.

The accompanying drawings illustrate my invention and form part of this specification.

Figure 1 is a perspective view of my improved sheep-rack. Fig. 2 is an end view or elevation of the same. Fig. 3 is a horizontal section showing a portion of the frame and the relation of the doors E to the same.

The main frame A is of the usual height—say three and a half to four feet—and about three and a half feet wide, and of any convenient length. The sides and bottom are made with a frame and common boards. Extending longitudinally through the middle of this device is a raised platform, B, about six inches high and sixteen inches wide, on which the hay falls. The sides of this are a few inches higher than its bottom, to prevent the hay-seed and dirt from running into the grain-troughs C, which run parallel to it, and also to form a rest for the ends of the racks D when down in position for feeding. These sides are beveled in to facilitate cleaning.

C C are grain-troughs about a foot wide, running the whole length, with the inside corners beveled.

On the sides of the frame A are slats extending up and down the whole height of the frame, each about ten or twelve inches wide, and with spaces from nine to twelve inches in width between each two slats, the width of the slats and of the spaces between them being arranged to give sufficient standing room for each sheep. The openings between the upright slats or panels F are arranged to be closed by sliding doors E on the inside of the frame. The doors E on each side of the rack are formed of vertical panels F, secured to horizontal bars G, the latter being united at their ends by vertical stiles H, which serve as holds for the hand to grasp as the said doors, in sets, are pushed or drawn to open or close the openings in the frame A, formed between the said panels F by the frame to which they are secured. This is very useful, enabling one to shut out the sheep when the grain is being placed in the feeding-troughs, or when it is necessary to clean them out. The racks D D, which hold the hay, are made of vertical slats, preferably, and are about two and a half feet long, being secured to a strip of board which runs lengthwise the rack, and which is in width nearly half the height of the slats. This is to prevent the hay-seed and dust from falling in the wool on the heads and necks of the feeding sheep, as well as to give security to the slats. The board to which the rack-slats are fastened is hinged to the top of the posts sustaining the frame in such a way as to allow the racks to be turned to an upright position, where they may be retained by a hook or button, to allow the shepherd to walk the length of the hay-trough to feed the grain, or to clean it and the grain-troughs handily. When down, the lower ends of the slats rest against the inner inclined sides of the hay-trough. By these means I make a rack which I have found to be convenient to use when the hay and grain are separately fed, easily cleaned, and where the sheep are kept from unduly crowding each other when feeding grain, and free from the hay-seed or oats getting into their wool.

I am aware that sheep-racks have been invented and patented having some of the features shown and described in my application, such as long troughs, elevated walks between the same, opening in the sides of the frame, and means for closing the same. To such, therefore, broadly, I make no claim.

What I claim as new, and desire to secure by Letters Patent, is—

1. The combination, with the frame A, of the platform B, provided with longitudinal flanges, hinged racks for long feed, and grain-troughs C, substantially as set forth.

2. A rack for feeding sheep, composed of the frame A, provided with openings in its longitudinal sides, and sliding doors for closing said openings simultaneously, one side at a time, hinged racks, an elevated platform provided with longitudinal flanges to serve as stops to the said racks, and grain-troughs arranged on opposite sides of the said elevated platform, all arranged substantially as and for the purposes set forth.

EDGAR A. LEGATE.

Witnesses:
JAMES S. GRINNELL,
WM. H. ALLEN.